(12) United States Patent
Yoshida

(10) Patent No.: US 12,276,526 B2
(45) Date of Patent: Apr. 15, 2025

(54) SHIELDING DETECTION DEVICE AND COMPUTER READABLE MEDIUM

(71) Applicant: Mitsubishi Electric Corporation, Tokyo (JP)

(72) Inventor: Mitsunobu Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 366 days.

(21) Appl. No.: 17/775,582

(22) PCT Filed: Oct. 15, 2020

(86) PCT No.: PCT/JP2020/038997
§ 371 (c)(1),
(2) Date: May 10, 2022

(87) PCT Pub. No.: WO2021/131260
PCT Pub. Date: Jul. 1, 2021

(65) Prior Publication Data
US 2022/0397393 A1 Dec. 15, 2022

(30) Foreign Application Priority Data
Dec. 24, 2019 (JP) .................................. 2019-233351

(51) Int. Cl.
*G01C 7/04* (2006.01)
*G01S 17/894* (2020.01)
*G01S 17/931* (2020.01)

(52) U.S. Cl.
CPC .............. *G01C 7/04* (2013.01); *G01S 17/894* (2020.01); *G01S 17/931* (2020.01)

(58) Field of Classification Search
None
See application file for complete search history.

(56) References Cited

U.S. PATENT DOCUMENTS

| 2019/0137629 A1* | 5/2019 | Kotelova | .............. G01S 7/4817 |
| 2020/0341151 A1* | 10/2020 | Yoshida | ................. G01B 11/00 |
| 2022/0326387 A1* | 10/2022 | Goto | ..................... G01S 7/4817 |

FOREIGN PATENT DOCUMENTS

WO 2019/163005 A1 8/2019

OTHER PUBLICATIONS

International Search Report and Written Opinion mailed on Dec. 22, 2020, received for PCT Application PCT/JP2020/038997, Filed on Oct. 15, 2020, 9 pages including English Translation.

* cited by examiner

Primary Examiner — Raul J Rios Russo
Assistant Examiner — Carl F. R. Tchatchouang
(74) Attorney, Agent, or Firm — XSENSUS LLP

(57) ABSTRACT

A shielding detection unit (111) detects one or more shielded sections in which a road surface of a target road, on which a measuring vehicle has traveled, has not been measured, based on three-dimensional point group data indicating a three-dimensional coordinate value of each measurement spot that has been measured by a laser scanner mounted on the measuring vehicle. A result display unit (112) generates a target road map and displays the target road map, the target road map indicating the target road and indicating the one or more shielded sections in a manner to distinguish the one or more shielded sections from each unshielded section in which the road surface of the target road has been measured.

14 Claims, 20 Drawing Sheets

Fig. 1
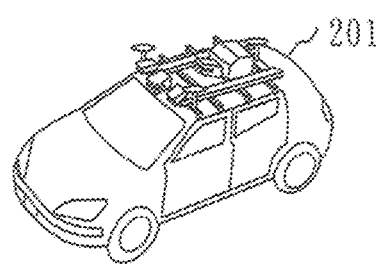
200: MOBILE MAPPING SYSTEM
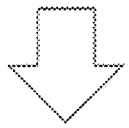
191 MEASUREMENT DATA
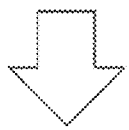
192 VEHICLE POSITION DATA  193 THREE-DIMENSIONAL POINT GROUP DATA
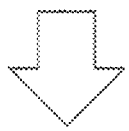
100 SHIELDING DETECTION DEVICE

300: TARGET ROAD MAP

SHIELDING DETECTION DEVICE AND COMPUTER READABLE MEDIUM

CROSS-REFERENCE TO RELATED APPLICATIONS

The present application is based on PCT filing PCT/JP2020/038997, filed Oct. 15, 2020, which claims priority to Japanese Application No. 2019-233351, filed Dec. 24, 2019, the entire contents of each are incorporated herein by reference.

TECHNICAL FIELD

The present invention relates to a technique for detecting shielding that occurs in mobile measurement performed in a mobile mapping system.

BACKGROUND ART

In a mobile mapping system (MMS), mobile measurement with a measuring vehicle is performed. In the mobile measurement, a laser scanner is used.

The laser scanner radiates laser light toward a road surface of a road. If the laser light is shielded by an obstacle such as a vehicle traveling in parallel, the road surface of the road cannot be measured.

In the case where a shielding size is large, mobile measurement needs to be performed again.

Patent Literature 1 discloses a technique for informing an operator of an occurrence of shielding during execution of mobile measurement.

CITATION LIST

Patent Literature

Patent Literature 1: WO 2019/163005

SUMMARY OF INVENTION

Technical Problem

Shielding can be reduced by applying the technique of Patent Literature 1 and devising how to drive a measuring vehicle. However, it is hard to completely avoid shielding. Further, in the case of an occurrence of shielding, a user finds the shielding for the first time at the time when the user visually checks measurement data obtained through post-processing performed after the end of the measurement. Therefore, measurement operation efficiency is lowered.

An object of the present invention is to make it easier for a user to grasp a shielded section in which mobile measurement needs to be performed again.

Solution to Problem

A shielding detection device of the present invention includes:

a shielding detection unit to detect one or more shielded sections in which a road surface of a target road, on which a measuring vehicle has traveled, has not been measured, based on three-dimensional point group data indicating a three-dimensional coordinate value of each measurement spot that has been measured by a laser scanner mounted on the measuring vehicle; and a result display unit to generate a target road map and to display the target road map, the target road map indicating the target road and indicating the one or more shielded sections in a manner to distinguish the one or more shielded sections from each unshielded section in which the road surface of the target road has been measured.

Advantageous Effects of Invention

According to the present invention, a shielded section is automatically detected and a map that indicates the shielded section and an unshielded section in a distinguished manner is displayed. Accordingly, a user can easily grasp the shielded section and grasp need for remeasurement.

BRIEF DESCRIPTION OF DRAWINGS

FIG. 1 is a configuration diagram of a mobile mapping system 200 according to Embodiment 1.

DESCRIPTION OF EMBODIMENTS

Figure 2:
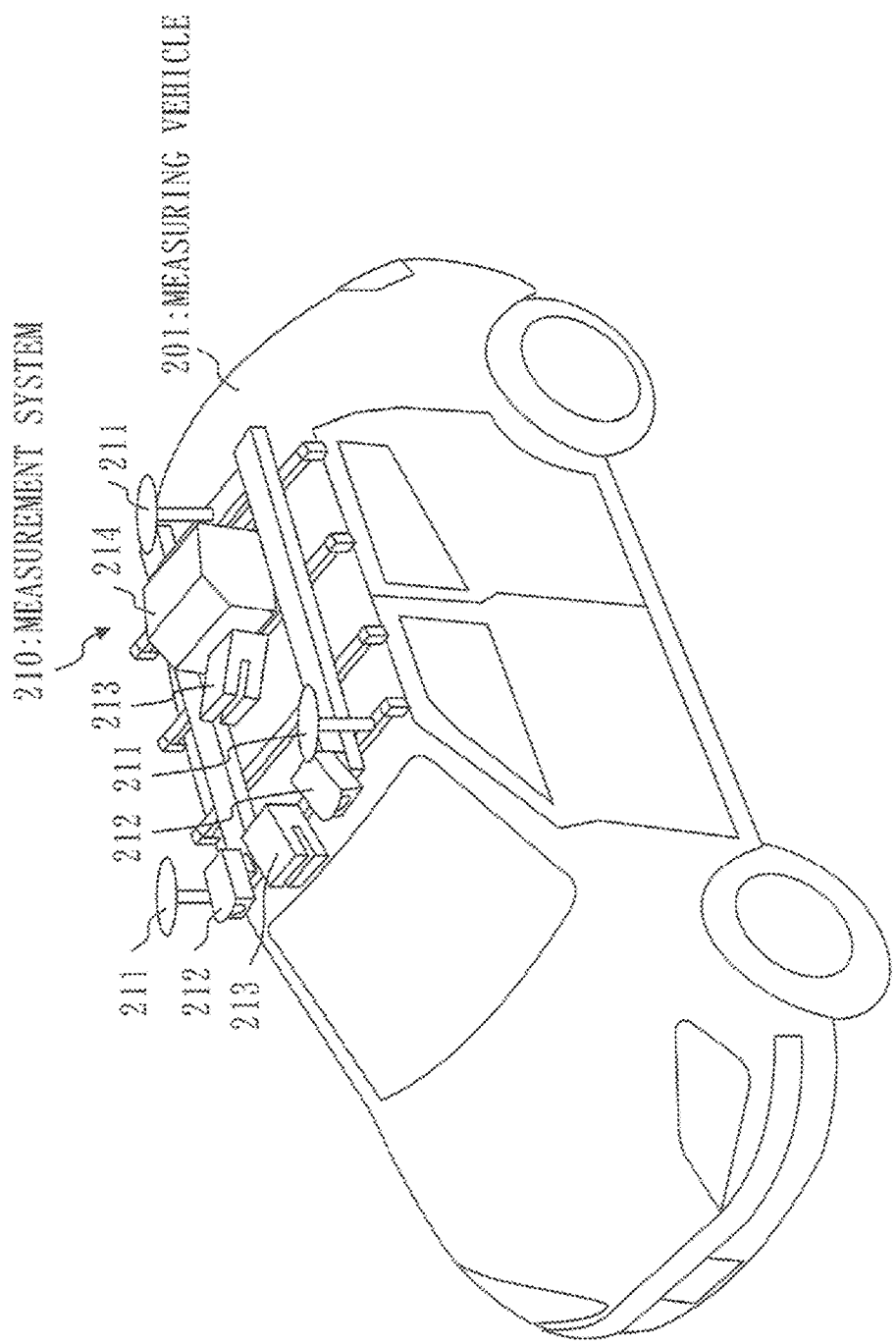
FIG. 2 is a configuration diagram of a measurement system 210 according to Embodiment 1.

In embodiments and drawings, the same or corresponding elements are given the same reference characters. Description of an element having the same reference character as that of a described element will be omitted or simplified as appropriate. An arrow in the drawings mainly indicates a flow of data or a flow of process.

Embodiment 1

An embodiment of detecting shielding that occurs in mobile measurement will be described with reference to FIGS. 1 to 9. The mobile measurement is performed in a mobile mapping system 200.

Description of Configuration

A configuration of the mobile mapping system 200 will be described with reference to FIG. 1.

The mobile mapping system 200 includes a measuring vehicle 201 and a shielding detection device 100.

The measuring vehicle 201 is a vehicle for measuring roads and features around the roads while traveling on the roads. A specific example of the vehicle is an automobile.

Measurement by the measuring vehicle 201 is referred to as "mobile measurement".

A road on which the measuring vehicle 201 has traveled is referred to as a "target road".

A lane on which the measuring vehicle 201 has traveled is referred to as a "traveling lane".

A lane on the right side of the traveling lane is referred to as a "right lane".

A lane on the left side of the traveling lane is referred to as a "left lane".

A configuration of the measuring vehicle 201 will be described with reference to FIG. 2.

The measuring vehicle 201 includes a measurement system 210.

The measurement system 210 is a system for mobile measurement and is attached to the roof of the measuring vehicle 201.

The measurement system 210 includes one or more antennas 211, one or more cameras 212, one or more laser scanners 213, and an IMU 214.

The antenna 211 is an antenna for satellite positioning system and receives a positioning signal transmitted from a positioning satellite.

The satellite positioning system is also called a Global Navigation Satellite System (GNSS). A specific example of the satellite positioning system is a Global Positioning System (GPS).

Positioning by the satellite positioning system is referred to as "satellite positioning".

The positioning satellite is an artificial satellite for the satellite positioning system.

The positioning signal is a signal transmitted from a positioning satellite for satellite positioning.

The camera 212 photographs a target road and a periphery of the target road.

The laser scanner 213 radiates laser light to each azimuth and receives the laser light reflected at each spot so as to measure time from the radiation to the light reception. Thus, a distance and an azimuth to each spot of the target road or each spot of the periphery of the target road are measured.

Measurement with the laser scanner 213 is referred to as "laser measurement".

The IMU 214 is an inertial measurement device and measures an angular velocity of the measuring vehicle 201 and an acceleration rate of the measuring vehicle 201.

Referring back to FIG. 1, the description of the mobile mapping system 200 will be continued.

Measurement data 191 is obtained by the mobile measurement using the measuring vehicle 201.

The measurement data 191 includes observation data at each clock time, image data at each clock time, laser point group data, and inertial data.

The observation data is data obtained by the antenna 211 and indicates a reception result of a positioning signal, a content of the positioning signal, and the like.

The image data is data obtained by the camera 212 and represents images of the target road and the periphery of the target road.

The laser point group data is data obtained by the laser scanner 213. The laser point group data includes laser point data of each spot measured by the laser scanner 213. The laser point data of each spot indicates measurement clock time, a distance (measurement distance) from the laser scanner 213, and an azimuth (measurement azimuth) from the laser scanner 213.

The inertia data is data obtained by the IMU 214. The inertia data indicates an angular velocity of the measuring vehicle 201 at each clock time and an acceleration rate of the measuring vehicle 201 at each clock time.

Vehicle position data 192 and three-dimensional point group data 193 are obtained by post-processing with respect to the measurement data 191.

The vehicle position data 192 is data indicating a position of the measuring vehicle 201 at each clock time. The position of the measuring vehicle 201 is identified based on a three-dimensional coordinate value.

The position of the measuring vehicle 201 at each clock time is calculated based on the satellite positioning using observation data at each clock time, inertial navigation using inertial data, or a combination of the satellite positioning and the inertial navigation.

The three-dimensional point group data 193 includes three-dimensional point data at each spot measured by the laser scanner 213. The three-dimensional point data at each spot indicates measurement clock time, a position, and a color. The position of each spot is identified based on a three-dimensional coordinate value.

A position of each spot is calculated by using the vehicle position data 192 and laser point group data. Specifically, a position of each spot is a position that is separated from the position of the laser scanner 213 to a measurement azimuth by a measurement distance. The position of the laser scanner 213 is calculated based on the position of the measuring vehicle 201.

A color of each spot is determined based on image data. Specifically, a pixel showing each spot is extracted from an image. The color of the extracted pixel is the color of each spot.

The shielding detection device 100 detects one or more shielded sections based on the three-dimensional point group data 193.

A shielded section is a section in which a road surface of a target road has not been measured. Specifically, a shielded section is a section in which a road surface of a target road has not been measured because laser light, which has been radiated from the laser scanner 213 toward the road surface of the target road, has been shielded.

In the case where laser light is shielded by another vehicle traveling in parallel with the measuring vehicle 201, a road surface of a lane on which the other vehicle is traveling is not measured. That is, while another vehicle is traveling in parallel on a right lane, the road surface of the right lane is not measured. Also, while another vehicle is traveling in parallel on a left lane, the road surface of the left lane is not measured.

Figure 3:
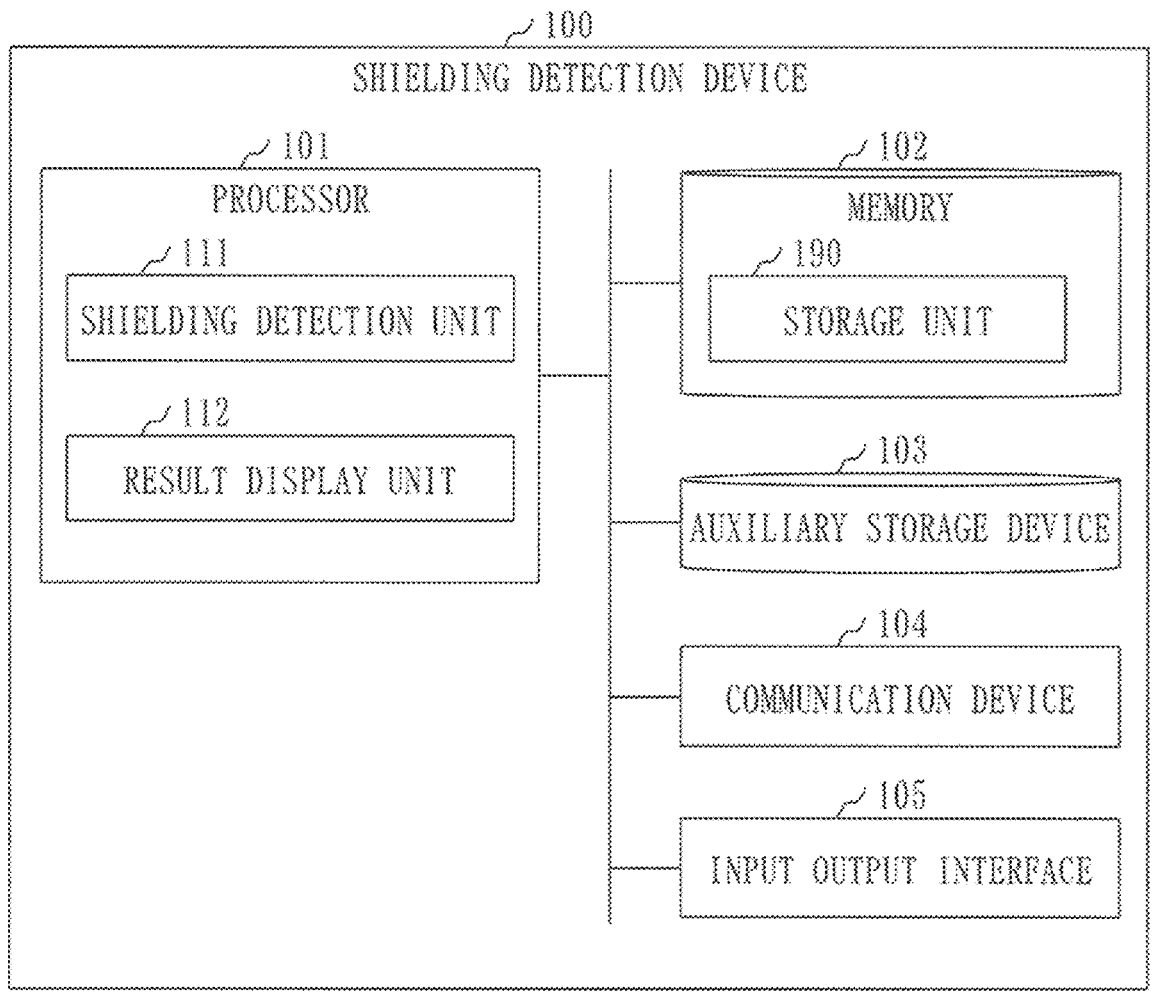
FIG. 3 is a configuration diagram of a shielding detection device 100 according to Embodiment 1.

A configuration of the shielding detection device 100 will be described with reference to FIG. 3.

The shielding detection device 100 is a computer including hardware such as a processor 101, a memory 102, an auxiliary storage device 103, and a communication device 104. These pieces of hardware are mutually connected via a signal line.

The processor 101 is an IC performing arithmetic processing and controls other hardware. For example, the processor 101 is a CPU, a DSP, or a GPU.

IC is an abbreviated name of Integrated Circuit.

CPU is an abbreviated name of Central Processing Unit.

DSP is an abbreviated name of Digital Signal Processor.

GPU is an abbreviated name of Graphics Processing Unit.

The memory 102 is a volatile or non-volatile storage device. The memory 102 is also called a main storage device or a main memory. The memory 102 is a RAM, for example. Data stored in the memory 102 is stored in the auxiliary storage device 103 as needed.

RAM is an abbreviated name of Random Access Memory.

The auxiliary storage device 103 is a non-volatile storage device. The auxiliary storage device 103 is a ROM, an HDD, or a flash memory, for example. Data stored in the auxiliary storage device 103 is loaded on the memory 102 as needed.

ROM is an abbreviated name of Read Only Memory.

HDD is an abbreviated name of Hard Disk Drive.

The communication device 104 is a receiver and a transmitter. The communication device 104 is a communication chip or an NIC, for example.

NIC is an abbreviated name of Network Interface Card.

An input output interface 105 is a port to which an input device and an output device are connected. For example, the input output interface 105 is an USB terminal, the input device is a keyboard and a mouse, and the output device is a display.

USB is an abbreviated name of Universal Serial Bus.

The shielding detection device 100 includes elements such as a shielding detection unit 111 and a result display unit 112. These elements are realized by software.

The auxiliary storage device 103 stores a shielding detection program used for making the computer function as the shielding detection unit 111 and the result display unit 112. The shielding detection program is loaded on the memory 102 and executed by the processor 101.

The auxiliary storage device 103 further stores an OS. At least part of the OS is loaded on the memory 102 and executed by the processor 101.

The processor 101 executes the shielding detection program while executing the OS.

OS is an abbreviated name of Operating System.

Input output data of the shielding detection program is stored in a storage unit 190.

The memory 102 functions as the storage unit 190. However, a storage device such as the auxiliary storage device 103, a register in the processor 101, and a cache memory in the processor 101 may function as the storage unit 190 instead of or together with the memory 102.

The storage unit 190 stores the measurement data 191, the vehicle position data 192, the three-dimensional point group data 193, and the like, for example.

The shielding detection device 100 may include a plurality of processors substituting for the processor 101. The plurality of processors share the function of the processor 101.

The shielding detection program can be computer-readably recorded (stored) in non-volatile recording media such as an optical disc and a flash memory.

Description of Operation

A procedure of the operation of the shielding detection device 100 corresponds to a shielding detection method. Further, the procedure of the operation of the shielding detection device 100 corresponds to a procedure of process by the shielding detection program.

Figure 4:
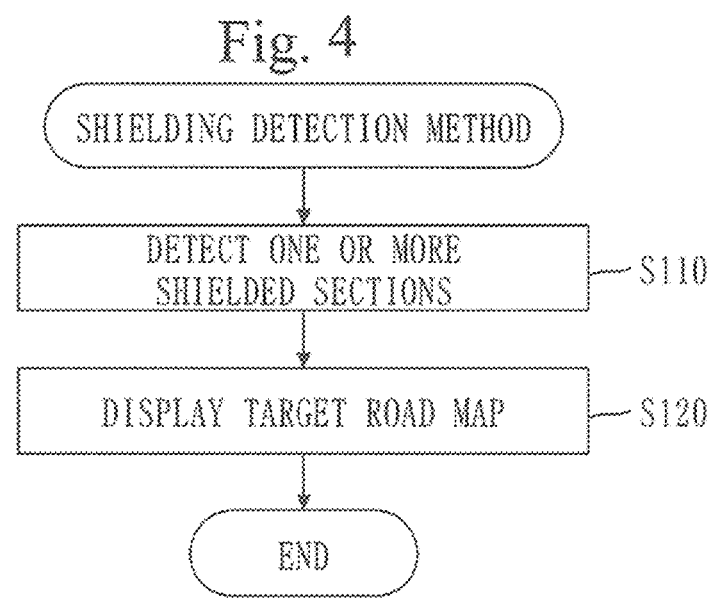
FIG. 4 is a flowchart of a shielding detection method according to Embodiment 1.

The shielding detection method will be described with reference to FIG. 4.

In step S110, the shielding detection unit 111 detects one or more shielded sections based on the three-dimensional point group data 193.

One or more shielded sections are detected as follows.

First, the shielding detection unit 111 detects one or more candidate sections based on the three-dimensional point group data 193.

A candidate section is a section in which a road surface of a target road has not been measured. Specifically, a candidate section is a section in which a road surface of a target road has not been measured because laser light, which has been radiated from the laser scanner 213 toward the road surface of the target road, has been shielded. Alternatively, a candidate section is a section in which a road surface of a right lane (or a left lane) has not been measured because the measuring vehicle 201 has traveled on a right end (or a left end) lane on a target road and therefore, a right lane (or left lane) does not exist.

In the case where laser light is shielded by another vehicle traveling in parallel with the measuring vehicle 201, a road surface of a lane on which the other vehicle is traveling is not measured. That is, while another vehicle is traveling in parallel on a right lane, the road surface of the right lane is not measured. Also, while another vehicle is traveling in parallel on a left lane, the road surface of the left lane is not measured.

When the measuring vehicle 201 is traveling on a lane closer to a sidewalk or a lane closer to a wall, a road surface of the target road is not measured near the sidewalk or the wall.

Then, the shielding detection unit 111 calculates a shielded amount of each of the candidate sections.

The shielded amount of each candidate section is any of a distance of each candidate section, a time length of each candidate section, and a size of each candidate section.

The distance of each candidate section is the length of each candidate section.

The time length of each candidate section is the length of time taken for measurement of each candidate section.

The size of each candidate section is a value calculated based on the distance of each candidate section and the time length of each candidate section.

After that, the shielding detection unit 111 determines each candidate section that corresponds to a shielded amount exceeding a threshold value, as a shielded section.

More specifically, each shielded section is detected as follows.

The shielding detection unit 111 determines each candidate section that corresponds to a shielded amount exceeding a threshold value, among lane present candidate sections, as a shielded section.

The lane present candidate sections are remaining candidate sections obtained by excluding lane absent candidate sections.

The lane absent candidate sections are a candidate section in which the road surface of the target road has not been measured on the right side of the traveling lane because a right lane does not exist, and a candidate section in which the road surface of the target road has not been measured on the left side of the traveling lane because a left lane does not exist.

Further, the shielding detection unit 111 categorizes each of one or more shielded sections into any one of a right-side shielded section, a left-side shielded section, and a both-side shielded section.

The right-side shielded section is a section in which the road surface of the target road has not been measured on the right side of the traveling lane.

The left-side shielded section is a section in which the road surface of the target road has not been measured on the left side of the traveling lane.

The both-side shielded section is a section in which the road surface of the target road has not been measured on both of the right side and the left side of the traveling lane.

A procedure of a shielding detection process (S110) will be described with reference to FIG. 5.

In step S111, the shielding detection unit 111 searches for a candidate section by referring to each three-dimensional point data included in the three-dimensional point group data 193 in an order of measurement clock time.

For example, the shielding detection unit 111 searches for a candidate section as follows.

The shielding detection unit 111 searches for a section in which each spot, having the different height from the height of the road surface of the traveling lane, has been measured. The section is the candidate section. The height of the road surface of the traveling lane is calculated based on a height indicated by a three-dimensional coordinate value of the measuring vehicle 201.

The shielding detection unit 111 extracts laser point data corresponding to each three-dimensional point data from laser point group data so as to search for a candidate section based on corresponding laser point data. Specifically, the shielding detection unit 111 searches for a candidate section by the method disclosed in Patent Literature 1.

When a candidate section is found, the process goes to step S112.

When a candidate section is not found, the shielding detection process (S110) is ended.

In Step S112, the shielding detection unit 111 categorizes the candidate section into any one of a right-side shielded section, a left-side shielded section, and a both-side shielded section based on corresponding three-dimensional point data of the candidate section.

When three-dimensional point data of each spot other than the road surface of the target road indicates a three-dimensional coordinate value of the right side of the measuring vehicle 201, the candidate section is a right-side shielded section.

When three-dimensional point data of each spot other than the road surface of the target road indicates a three-dimensional coordinate value of the left side of the measuring vehicle 201, the candidate section is a left-side shielded section.

A candidate section that is a right-side shielded section and is also a left-side shielded section is a both-side shielded section.

Each spot other than the road surface of the target road is a spot having the different height from the height of the road surface of the traveling lane. Each spot other than the road surface of the target road may be specified based on laser point data corresponding to three-dimensional point data of each spot by the method disclosed in Patent Literature 1.

In step S113, the shielding detection unit 111 determines whether a target lane exists.

When the candidate section is a right-side shielded section, a right lane is the target lane.

When the candidate section is a left-side shielded section, a left lane is the target lane.

When the candidate section is a both-side shielded section, both of the right lane and the left lane are the target lanes.

For example, the shielding detection unit 111 performs determination as follows.

The shielding detection unit 111 determines whether the traveling lane in the candidate section is a lane closer to a sidewalk. When the traveling lane in the candidate section is a lane closer to a sidewalk, a lane (left lane) does not exist on the sidewalk side.

The shielding detection unit 111 determines whether the traveling lane in the candidate section is a lane closer to a wall. When the traveling lane in the candidate section is a lane closer to a wall, a lane (right lane or left lane) on the wall side does not exist.

The traveling lane of the measuring vehicle 201 can be specified by using a white line detection technique.

The white line detection technique is a technique for detecting a white line drawn on a road by using three-dimensional point group data.

When a white line is drawn on the left end of a traveling lane, the traveling lane is a lane closer to a sidewalk.

The traveling lane of the measuring vehicle 201 can be specified based on a three-dimensional shape indicated by the three-dimensional point group data 193. The three-dimensional point group data 193 indicates three-dimensional shapes of a road surface, a curb, a wall surface, and the like.

When there is a curb on the left side of a traveling lane, the traveling lane is a lane closer to a sidewalk.

When there is a wall along a traveling lane, the traveling lane is a lane closer to a wall.

The traveling lane of the measuring vehicle 201 can be specified by referring to base map data.

The base map data is data indicating detailed information of each road such as information related to lanes of each road.

When a target lane exists, the process goes to step S114.

When a target lane does not exist, the process goes to step S111.

In step S114, the shielding detection unit 111 calculates a shielded amount of the candidate section based on corresponding three-dimensional point data of the candidate section.

Specifically, the shielding detection unit 111 calculates the distance of the candidate section based on a three-dimensional coordinate value indicated by corresponding three-dimensional point data of the candidate section. Alternatively, the shielding detection unit 111 calculates the time length of the candidate section based on measurement clock time indicated by corresponding three-dimensional point data of the candidate section. Alternatively, the shielding detection unit 111 calculates the size of the candidate section based on the distance of the candidate section and the time length of the candidate section.

In step S115, the shielding detection unit 111 compares the shielded amount of the candidate section with a threshold value so as to determine whether the shielded amount of the candidate section exceeds the threshold value.

When the shielded amount of the candidate section exceeds the threshold value, the process goes to step S116.

When the shielded amount of the candidate section does not exceed the threshold value, the process goes to step S111.

In step S116, the shielding detection unit 111 registers shielded section data on detection result data.

The shielded section data indicates positional information of the shielded section and the category of the shielded section.

After step S116, the process goes to step S111.

Referring back to FIG. 4, step S120 will be described.

In step S120, the result display unit 112 generates and displays a target road map.

The target road map indicates a target road and indicates one or more detected shielded sections in a manner to distinguish the shielded sections from each unshielded section. An unshielded section is a section other than shielded sections, that is, a section in which a road surface of the target road has been measured.

Further, the result display unit 112 distinguishes a right-side shielded section, a left-side shielded section, and a both-side shielded section from each other on the target road map.

Figure 6:
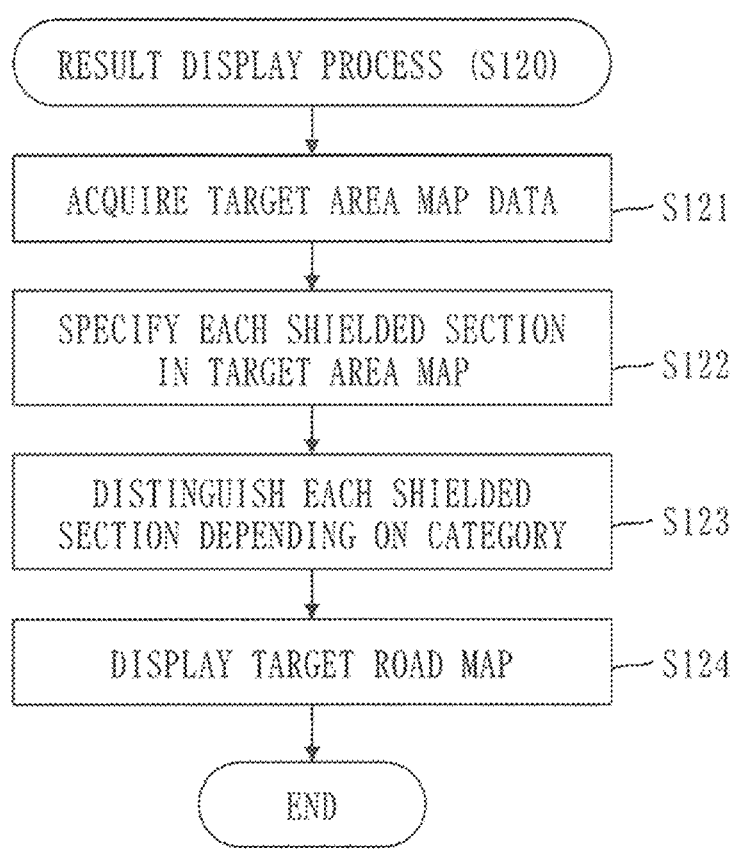
FIG. 6 is a flowchart of a result display process (S120) according to Embodiment 1.

The procedure of a result display process (S120) will be described with reference to FIG. 6.

In step S121, the result display unit 112 acquires target area map data.

The target area map data indicates a target area map.

The target area map is a map indicating a target area.

The target area is an area including a target road.

Specifically, the result display unit 112 acquires the target area map data from a map database. For example, the map database is stored in a map server.

Figure 5:
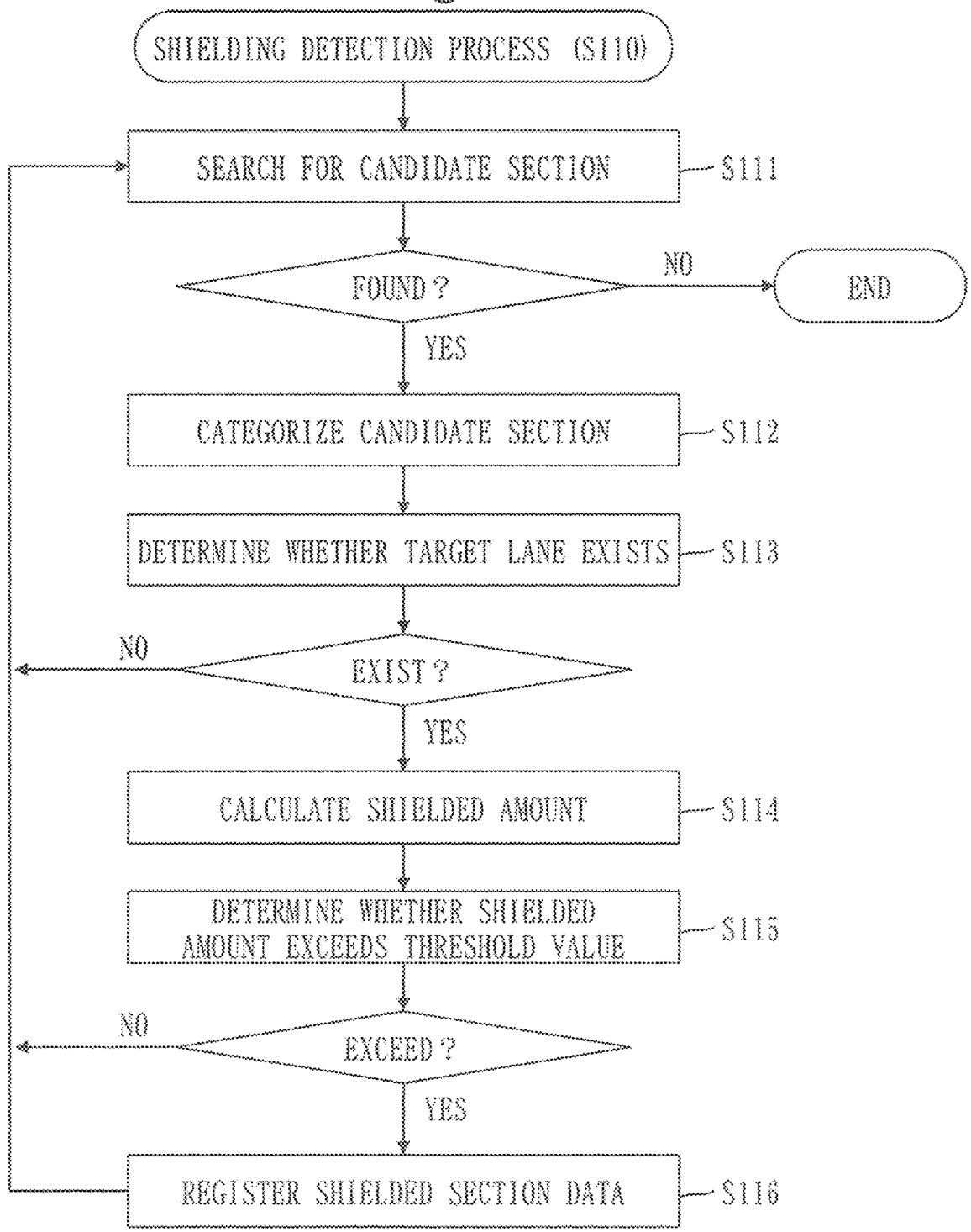
FIG. 5 is a flowchart of a shielding detection process (S110) according to Embodiment 1.

In step S122, the result display unit 112 specifies each shielded section in the target area map based on positional information of each shielded section indicated in the detection result data (refer to step S116 of FIG. 5).

In step S123, the result display unit 112 distinguishes each shielded section in the target area map based on the category of each shielded section indicated in the detection result data (refer to step S116 of FIG. 5).

Specifically, the result display unit 112 distinguishes an unshielded section, a right-side shielded section, a left-side shielded section, and a both-side shielded section from each other depending on a color or a pattern.

The target area map obtained after step S123 is the target road map.

In step S124, the result display unit 112 displays the target road map on a display.

Figure 7:
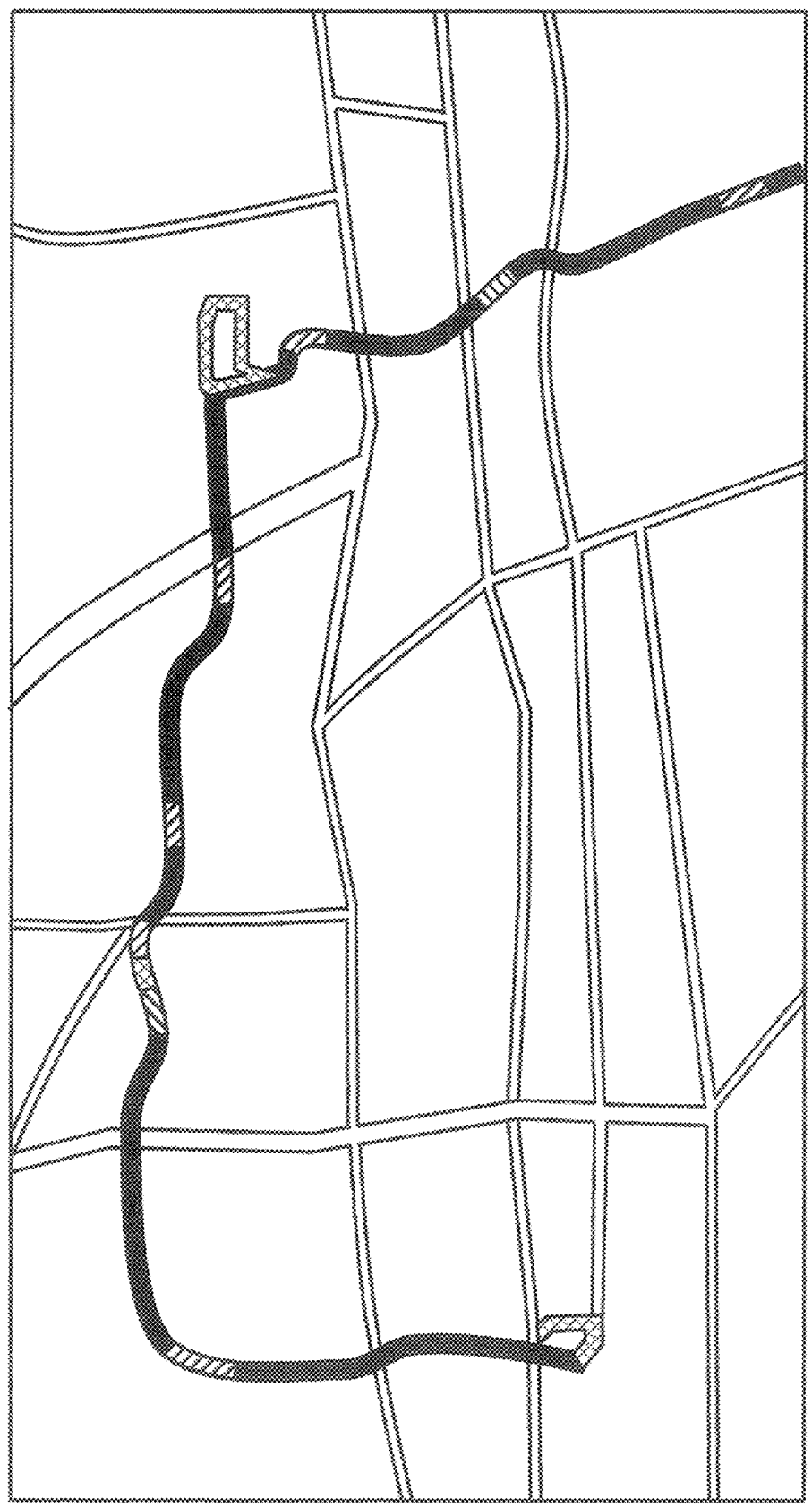
FIG. 7 is a diagram illustrating a target road map 300 according to Embodiment 1.

FIG. 7 illustrates a target road map 300. The target road map 300 is an example of the target road map.

A blackened or shaded part is a target road.

Each blackened part is an unshielded section.

Each shaded part is a shielded section.

Figure 8:
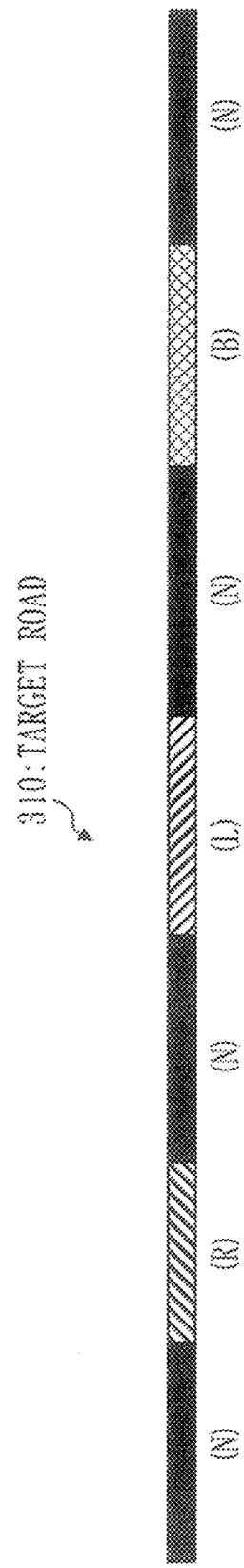
FIG. 8 is a diagram illustrating a target road 310 according to Embodiment 1.

FIG. 8 illustrates a target road 310. The target road 310 is an example of a target road indicated on the target road map.

Each blackened part (N) is an unshielded section.

A shaded part (R) is a right-side shielded section.

A shaded part (L) is a left-side shielded section.

A shaded part (B) is a both-side shielded section.

Advantageous Effects of Embodiment 1

According to Embodiment 1, a shielded section is automatically detected and a map indicating a shielded section and an unshielded section in a distinguished manner is displayed. Accordingly, a user can easily grasp the shielded section and grasp need for remeasurement. As a result, the user does not need visual check after the end of measurement, being able to improve the user's work efficiency. Further, when presence/absence of shielding can be checked and need for remeasurement can be grasped during measurement or immediately after the end of the measurement, remeasurement can be performed before a measuring vehicle leaves a measurement area. Thus, measurement efficiency can be improved.

A section having a small shielding size is not detected as a shielded section and therefore, a user can grasp only a section required for remeasurement as a shielded section.

As each shielded section is categorized into a right-side shielded section, a left-side shielded section, or a both-side shielded section, a user can determine a traveling lane, on which shielding can be most efficiently avoided, and can plan remeasurement.

A lane on which the measuring vehicle 201 travels is not shielded ordinarily. Therefore, the measurement data 191 with no shielding and the three-dimensional point group data 193 with no shielding can be securely acquired when the measuring vehicle 201 travels on a lane which has been shielded.

Description of Example

The shielding detection unit 111 may categorize a candidate section whose shielded amount does not exceed a threshold value (refer to step S115) into a remeasurement unnecessary section. That is, the shielding detection unit 111 may detect a remeasurement unnecessary section.

A remeasurement unnecessary section is a section in which a road surface of a target road has not been measured but remeasurement is not required because the shielded amount is within a permissible range.

The shielding detection unit 111 may detect an unmeasured lane.

An unmeasured lane is a lane of which both of a road surface and the upper side of the road surface have not been measured.

The result display unit 112 is capable of distinguishing each section based on corresponding attribute of each section.

For example, each section is distinguished as follows.

Each section is distinguished based on a plurality of colors having different hues, brightness, saturation, or tones from each other.

Each section is distinguished based on a geometric pattern (pattern).

Each section is distinguished based on the thickness of a line.

The result display unit 112 may distinguish each shielded section from each unshielded section for every lane.

Figure 9:
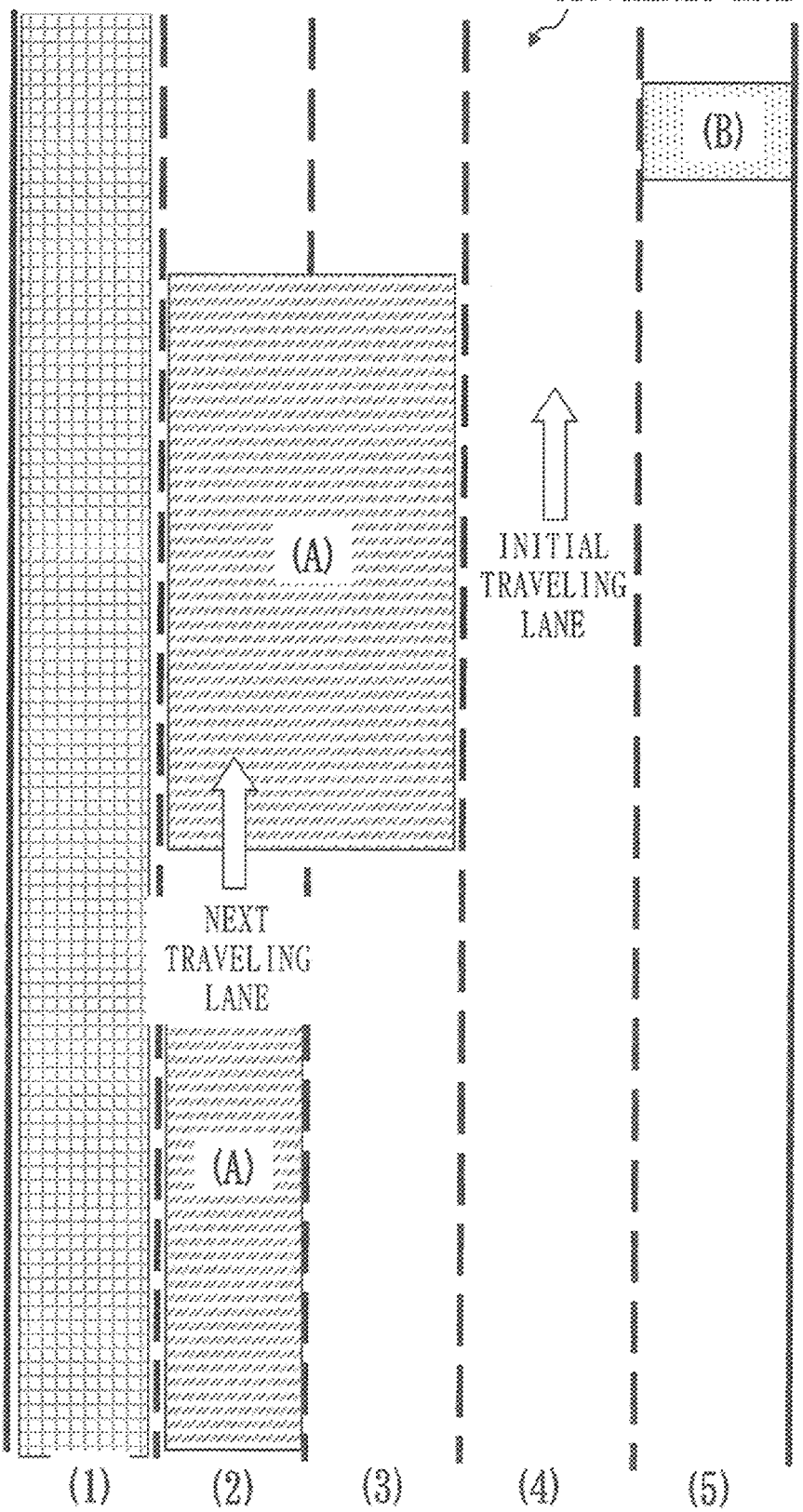
FIG. 9 is a diagram illustrating a target road map 320 according to Embodiment 1.

FIG. 9 illustrates a target road map 320. The target road map 320 is an example of the target road map.

The target road map 320 indicates a target road having five lanes (1) to (5).

A white part is an unshielded section.

The lane (4) is a traveling lane at an initial measurement time and is not shielded.

In each of the lane (2) and lane (3), each shielded section (A) is distinguished from an unshielded section. Each shielded section (A) is a section which requires remeasurement.

In the lane (5), a remeasurement unnecessary section (B) is distinguished from an unshielded section.

The lane (1) is an unmeasured lane and is distinguished from other lanes.

A user refers to the target road map 320 and thereby can determine that shielding can be minimized by setting the lane (2) as a traveling lane at the next measurement.

Embodiment 2

Figure 10:
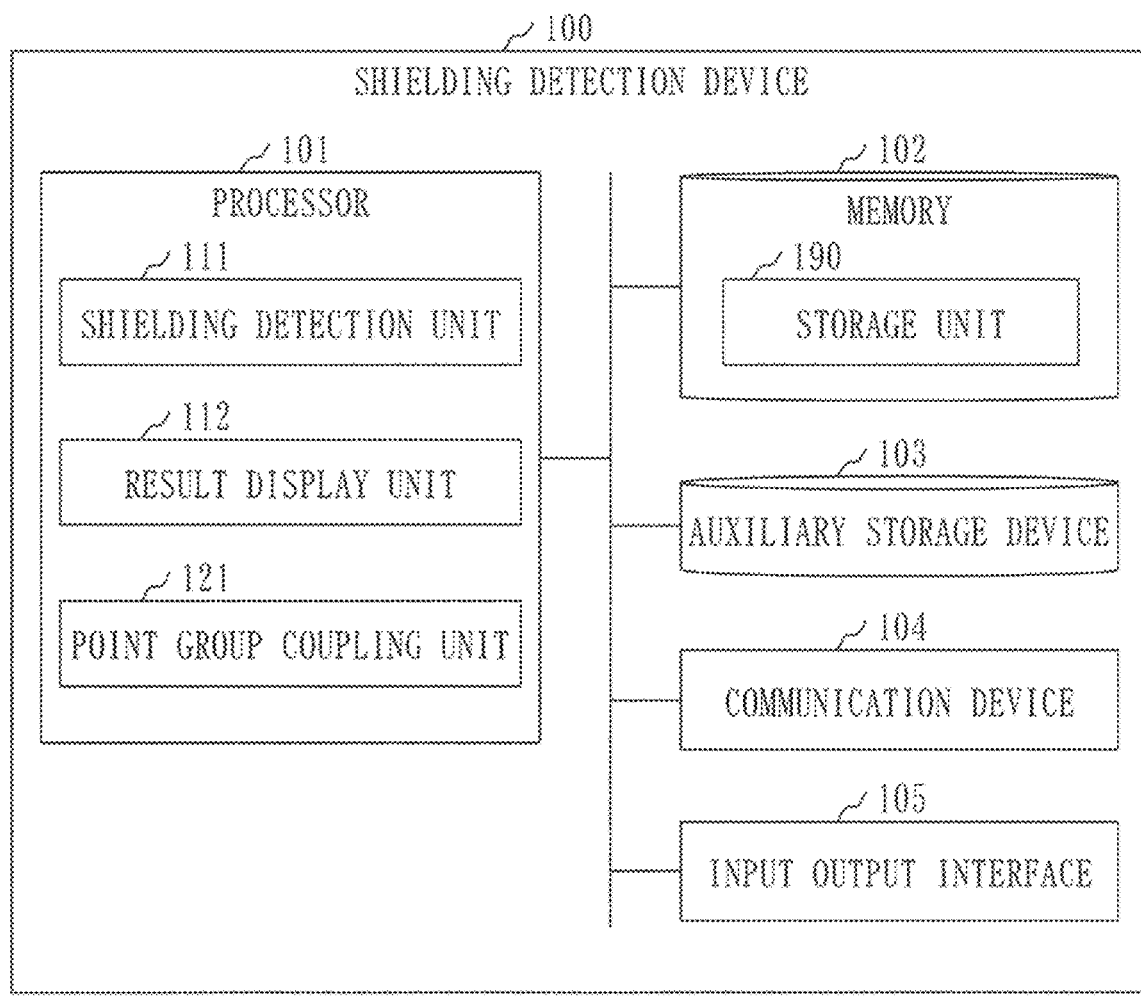
FIG. 10 is a configuration diagram of the shielding detection device 100 according to Embodiment 2.
Figure 11:
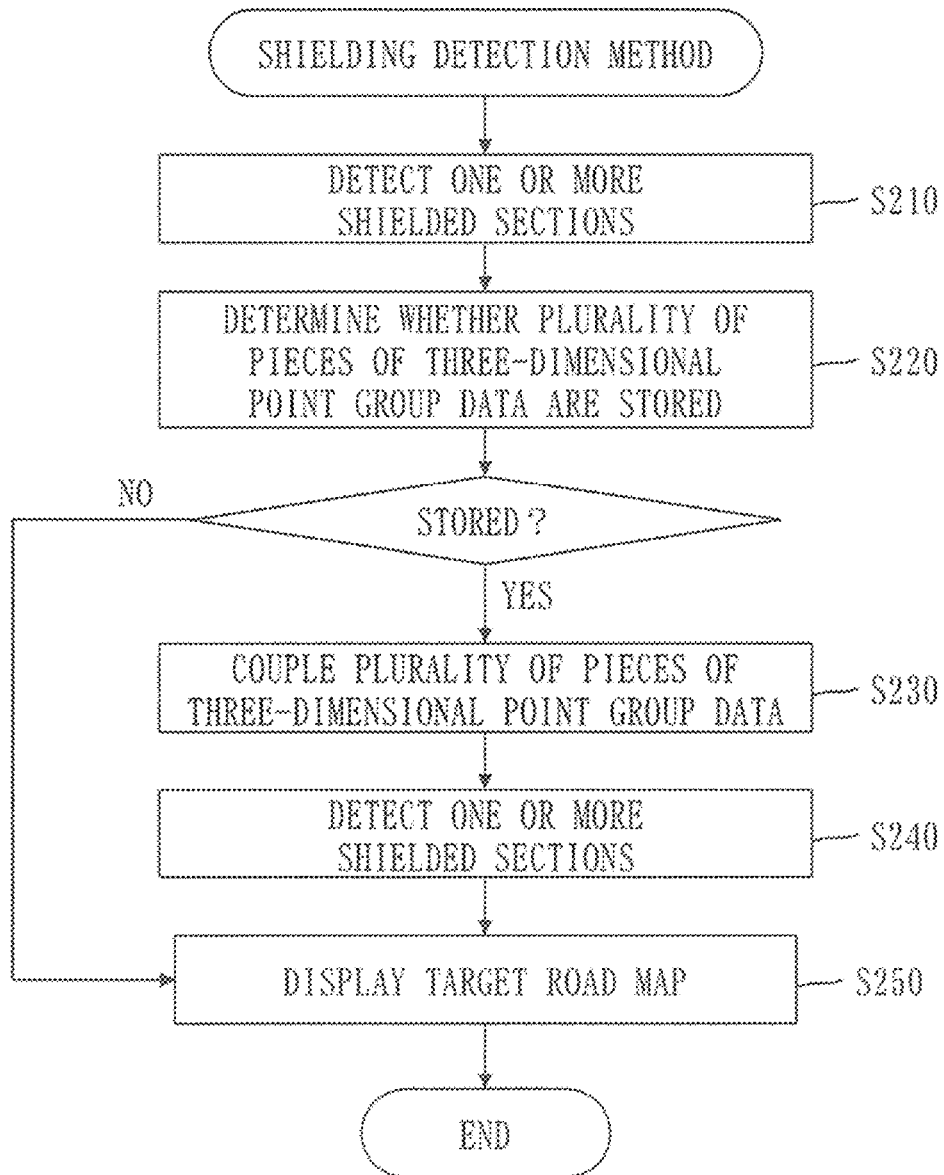
FIG. 11 is a flowchart of a shielding detection method according to Embodiment 2.
Figure 12:
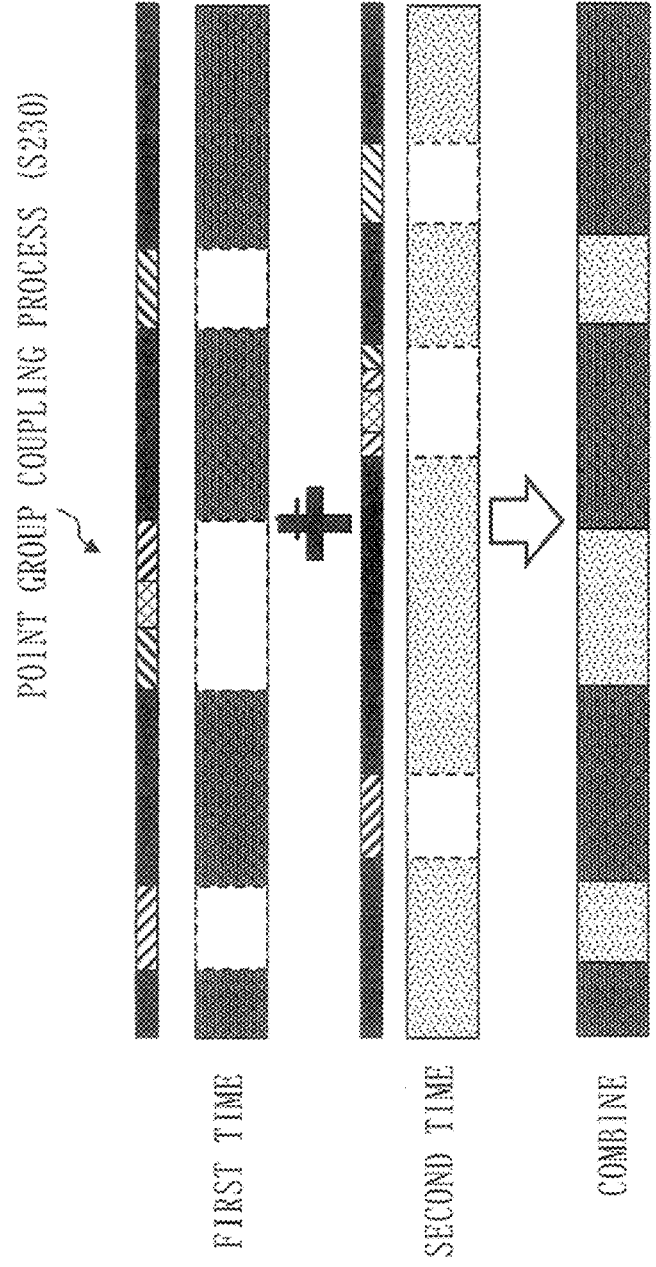
FIG. 12 is an explanatory diagram for a specific example of a point group coupling process (S230) according to Embodiment 2.

An embodiment for acquiring unshielded point group data will be described in a manner focusing on the difference from Embodiment 1 with reference to FIGS. 10 to 12. The unshielded point group data corresponds to three-dimensional point group data for the case where laser light radiated toward a road surface of a target road has not been shielded.

Description of Configuration

The configuration of the mobile mapping system 200 is the same as the configuration in Embodiment 1 (refer to FIG. 1 and FIG. 2).

The configuration of the shielding detection device 100 will be described with reference to FIG. 10.

The shielding detection device 100 further includes a point group coupling unit 121.

The shielding detection program further makes a computer function as the point group coupling unit 121.

Description of Operation

A shielding detection method will be described with reference to FIG. 11.

When a target road map indicates presence of a shielded section, the measuring vehicle 201 is to travel on the target road again in accordance with determination of a user checking the target road map.

The three-dimensional point group data 193 is generated whenever the measuring vehicle 201 travels on the target road, and the generated three-dimensional point group data 193 is stored in the storage unit 190.

That is, a plurality of pieces of three-dimensional point group data 193 are obtained when the measuring vehicle 201 travels on the target road a plurality of times, and the plurality of pieces of three-dimensional point group data 193 are stored in the storage unit 190.

Step S210 to step S240 are executed whenever the measuring vehicle 201 travels on a target road. That is, step S210 to step S240 are executed whenever the three-dimensional point group data 193 is stored in the storage unit 190.

In step S210, the shielding detection unit 111 detects one or more shielded sections based on the three-dimensional point group data 193.

Step S210 is the same as step S110 of Embodiment 1.

In step S220, the point group coupling unit 121 determines whether a plurality of pieces of three-dimensional point group data 193 are stored in the storage unit 190.

When a plurality of pieces of three-dimensional point group data 193 are stored in the storage unit 190, the process goes to step S230.

When a plurality of pieces of three-dimensional point group data 193 are not stored in the storage unit 190, the process goes to step S250.

In step S230, the point group coupling unit 121 couples the plurality of pieces of three-dimensional point group data 193 with each other. Three-dimensional point group data generated by coupling a plurality of pieces of three-dimensional point group data 193 is referred to as "coupled point group data".

Specifically, the point group coupling unit 121 combines pieces of three-dimensional point group data corresponding to unshielded sections among the plurality of pieces of three-dimensional point group data 193. Accordingly, coupled point group data is generated.

Referring back to FIG. 11, step S240 will be described.

In step S240, the shielding detection unit 111 detects one or more shielded sections based on the coupled point group data.

The procedure of step S240 is the same as the procedure of step S110 (refer to FIG. 5) of Embodiment 1.

Through step S240, detection result data corresponding to the coupled point group data is generated (refer to step S116 in FIG. 5).

In step S250, the result display unit 112 generates and displays a target road map.

Step S250 is the same as step S120 of Embodiment 1.

In step S250 on the first time, a target road map based on the three-dimensional point group data 193 is displayed.

In step S250 on the second time and later, a target road map based on the coupled point group data is displayed.

A specific example of a point group coupling process (S230) will be described with reference to FIG. 12.

Three shielded sections are detected based on the three-dimensional point group data 193 of the first time. A white part indicates a shielded section.

In the three-dimensional point group data 193 of the second time, a section corresponding to each shielded section of the three-dimensional point group data 193 of the first time is not a shielded section.

The point group coupling unit 121 extracts three-dimensional point group data corresponding to each section other than shielded sections from the three-dimensional point group data 193 of the first time.

The point group coupling unit 121 extracts three-dimensional point group data of the section corresponding to each shielded section of the three-dimensional point group data 193 of the first time from the three-dimensional point group data 193 of the second time.

Then, the point group coupling unit 121 combines the three-dimensional point group data extracted from the three-dimensional point group data 193 of the first time with the three-dimensional point group data extracted from the three-dimensional point group data 193 of the second time.

Unshielded point group data is thus obtained. The unshielded point group data corresponds to three-dimensional point group data for the case where laser light radiated toward a road surface of a target road has not been shielded.

Advantageous Effects of Embodiment 2

According to Embodiment 2, unshielded point group data can be generated by using a plurality of pieces of three-dimensional point group data 193.

SUPPLEMENT OF EMBODIMENTS

Figure 13:
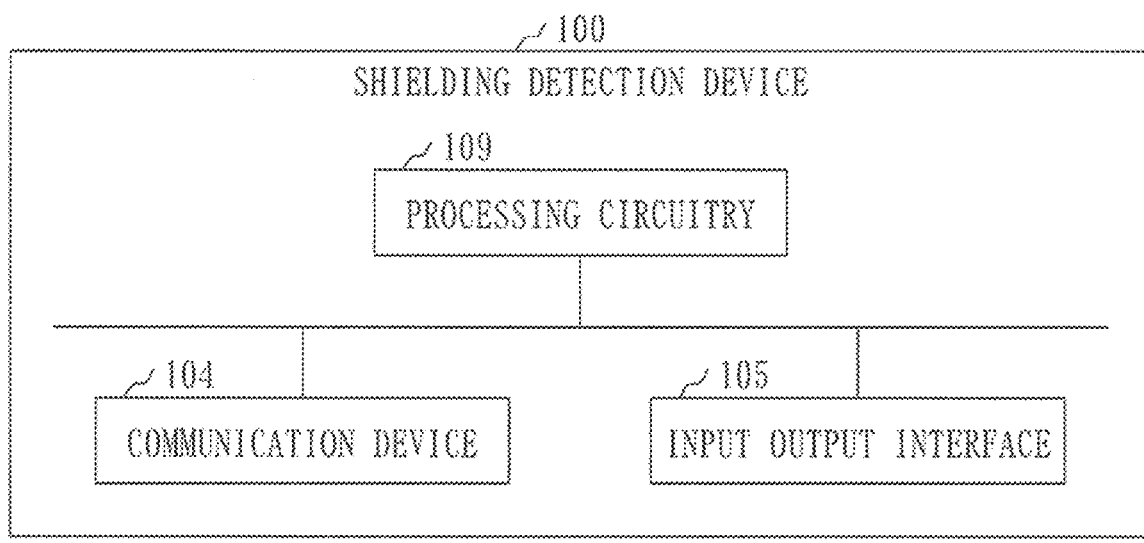
FIG. 13 is a hardware configuration diagram of the shielding detection device 100 according to the embodiments.

A hardware configuration of the shielding detection device 100 will be described with reference to FIG. 13.

The shielding detection device 100 includes processing circuitry 109.

The processing circuitry 109 is hardware that realizes the shielding detection unit 111, the result display unit 112, and the point group coupling unit 121.

The processing circuitry 109 may be dedicated hardware or the processor 101 that executes a program stored in the memory 102.

When the processing circuitry 109 is dedicated hardware, the processing circuitry 109 is a single circuit, a composite circuit, a programmed processor, a parallel programmed processor, an ASIC, an FPGA, or a combination of these, for example.

ASIC is an abbreviated name of Application Specific Integrated Circuit.

FPGA is an abbreviated name of Field Programmable Gate Array.

The shielding detection device 100 may include a plurality of processing circuits substituting for the processing circuitry 109. The plurality of processing circuits share the function of the processing circuitry 109.

In the processing circuitry 109, a part of the function may be realized by dedicated hardware and the rest of the function may be realized by software or firmware.

Thus, each function of the shielding detection device 100 can be realized by hardware, software, firmware, or a combination of these.

Measurement shielding by another vehicle 220 will be supplemented.

Figure 14:
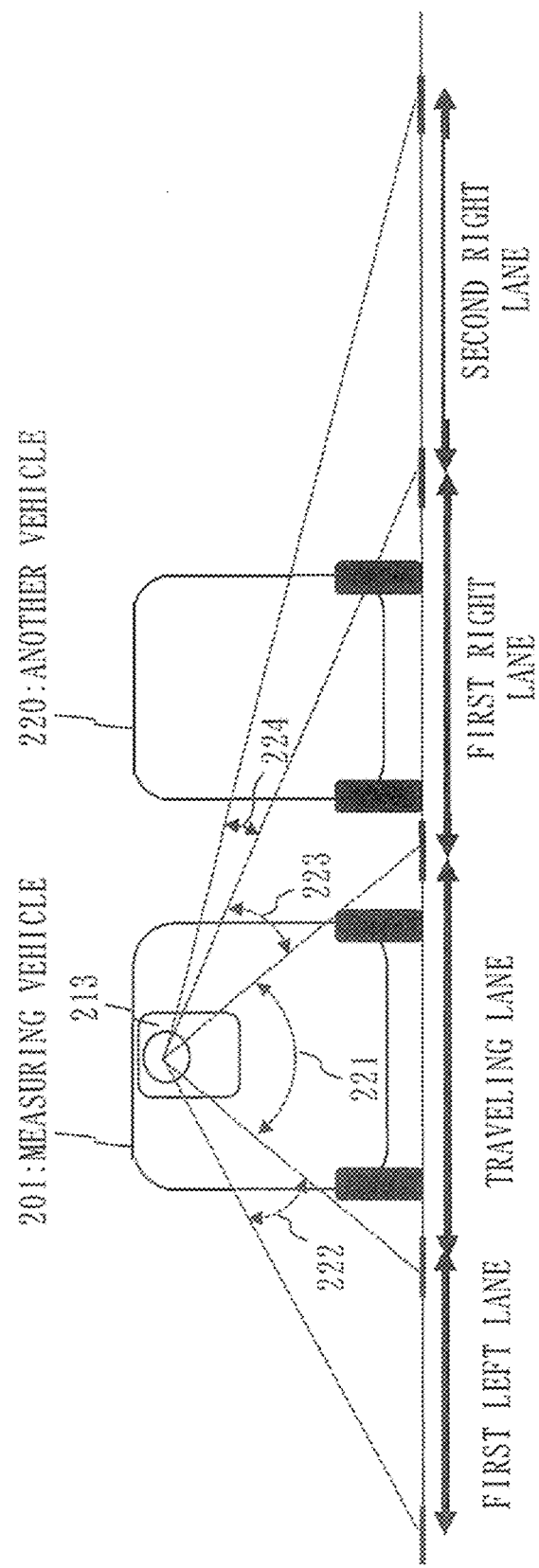
FIG. 14 is a diagram illustrating an example of a shielding relation according to the embodiments.

FIG. 14 illustrates a measurement road viewed from the behind of the measuring vehicle 201. The measurement road is a road on which the measuring vehicle 201 travels. That is, the measurement road is a road which is measured by the measuring vehicle 201.

Lanes are associated with respective angle ranges (221 to 224). The angle range is a range of a laser light radiation angle. The measuring vehicle 201 includes the laser scanner 213 that radiates laser light toward a road surface on the behind.

The angle range 221 is an angle range corresponding to a traveling lane.

The angle range 222 is an angle range corresponding to a first left lane. The first left lane is a lane on the immediate left of the traveling lane.

The angle range 223 is an angle range corresponding to a first right lane. The first right lane is a lane on the immediate right of the traveling lane.

The angle range 224 is an angle range corresponding to a second right lane. The second right lane is a lane on the immediate right of the first right lane.

When another vehicle 220 is on the right rear side of the measuring vehicle 201, laser light is shielded by another vehicle 220 in each of the angle range 223 and the angle range 224. On the other hand, laser light is not shielded in each of the angle range 221 and the angle range 222.

Figure 15:
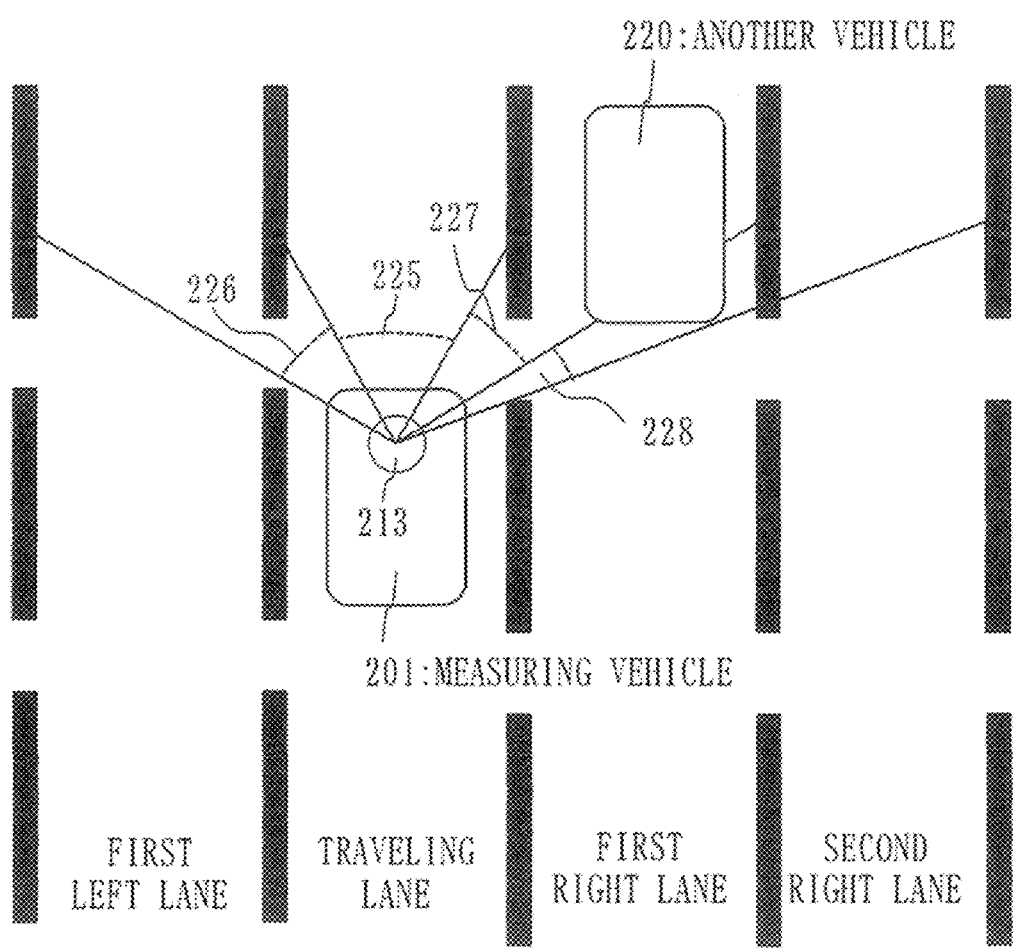
FIG. 15 is a diagram illustrating an example of a shielding relation according to the embodiments.

FIG. 15 illustrates a measurement road viewed from the top.

The measuring vehicle 201 includes the laser scanner 213 that radiates laser light toward a road surface on the front.

Lanes are associated with respective angle ranges (225 to 228).

The angle range 225 is an angle range corresponding to a traveling lane.

The angle range 226 is an angle range corresponding to a first left lane.

The angle range 227 is an angle range corresponding to a first right lane.

The angle range 228 is an angle range corresponding to a second right lane.

When another vehicle 220 is on the right front side of the measuring vehicle 201, laser light is shielded by another vehicle 220 in each of the angle range 227 and the angle range 228. On the other hand, laser light is not shielded in each of the angle range 225 and the angle range 226.

Figure 16:
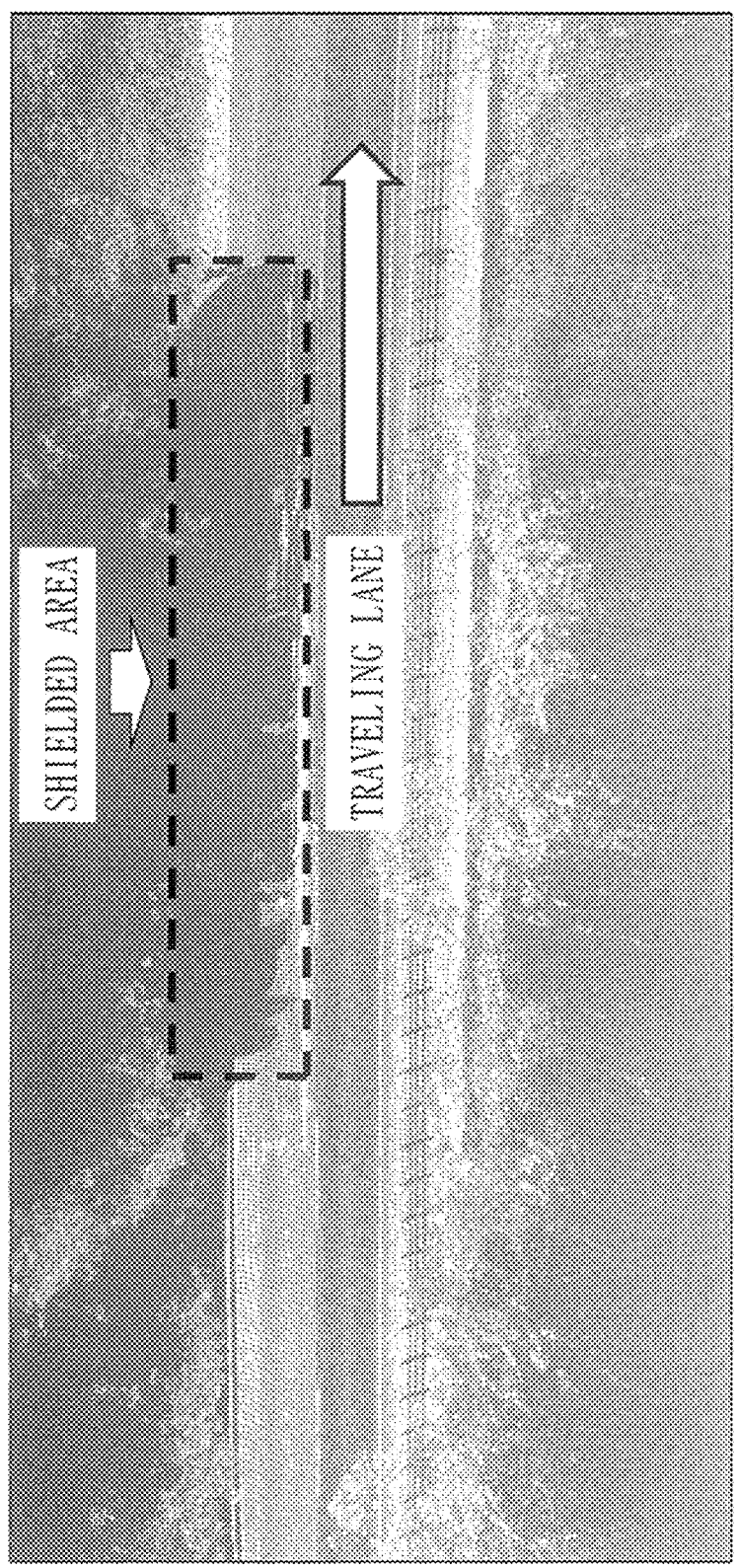
FIG. 16 is a diagram illustrating an example of a shielding relation according to the embodiments.

FIG. 16 shows a point group image obtained when the measuring vehicle 201 keeps traveling in parallel with another vehicle 220. The point group image is an image representing a group of laser light reflecting points. Each reflecting point is denoted by a figure such as a circle and a triangle.

Figure 17:
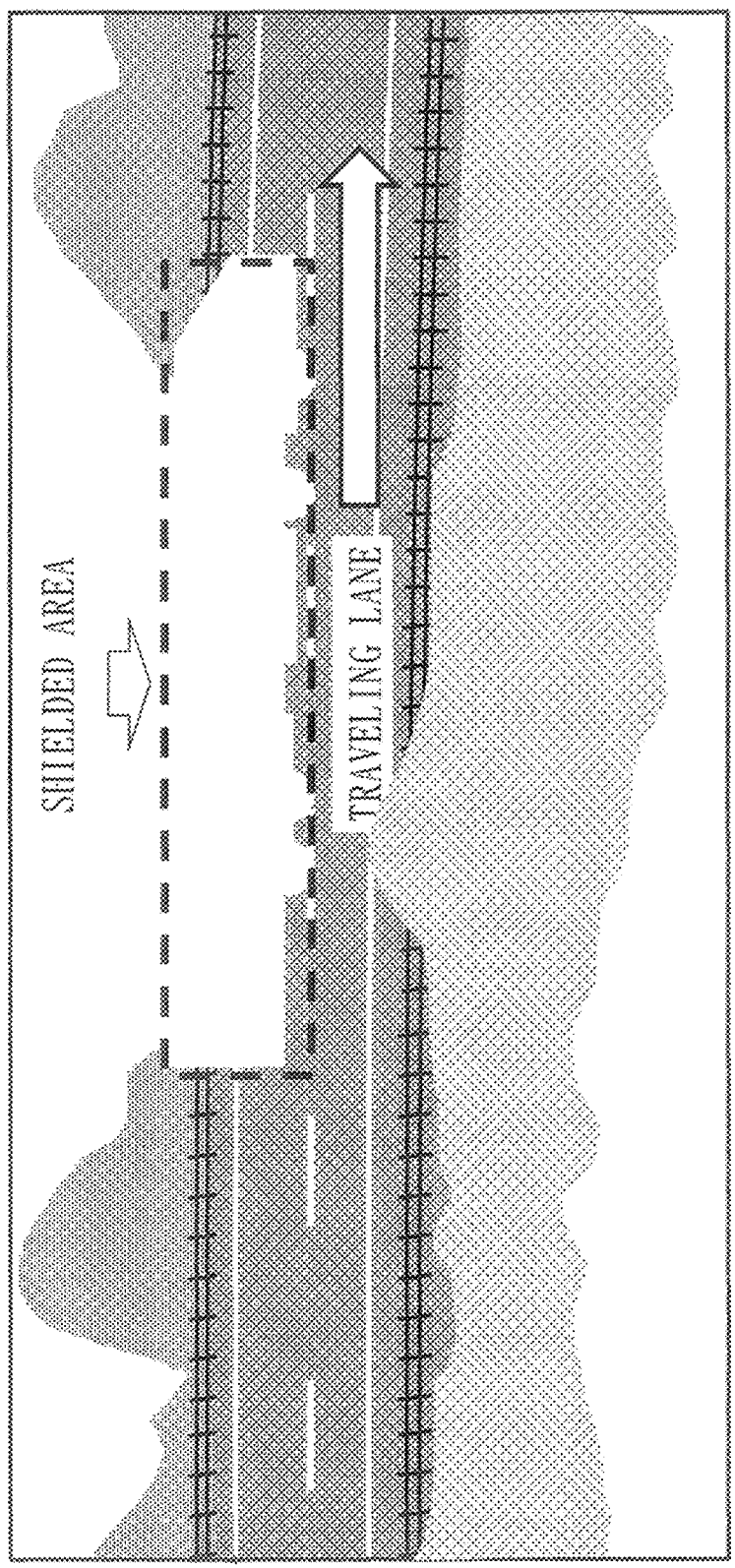
FIG. 17 is a diagram illustrating the example of the shielding relation according to the embodiments.

FIG. 17 is a picture drawing the point group image of FIG. 16.

When the measuring vehicle 201 keeps traveling in parallel with another vehicle 220, an area in which laser light is shielded by another vehicle 220 is widened.

Figure 18:
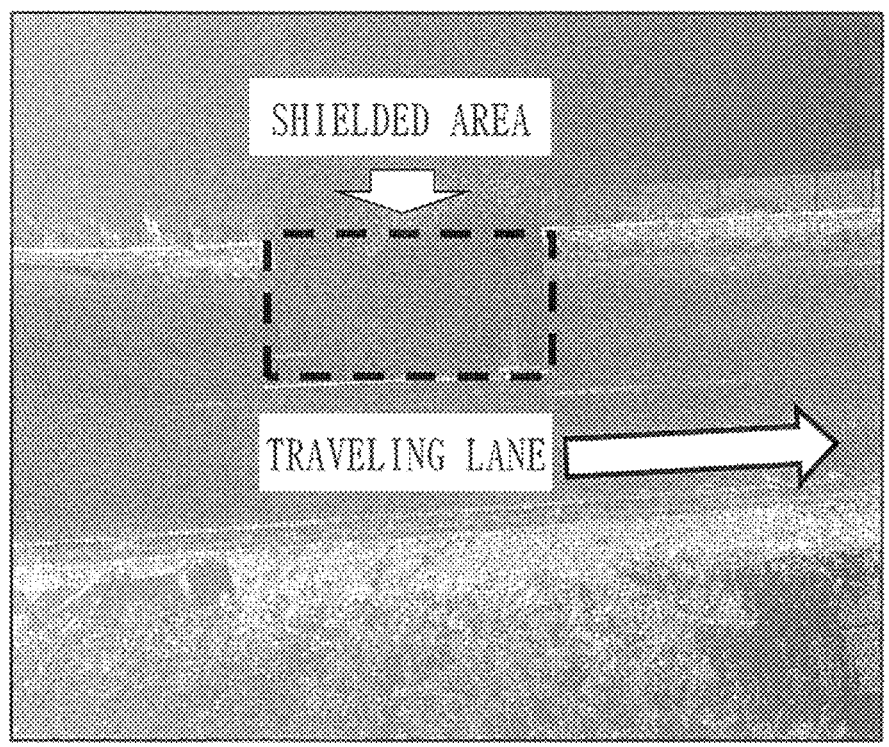
FIG. 18 is a diagram illustrating an example of a shielding relation according to the embodiments.

FIG. 18 shows a point group image obtained when the measuring vehicle 201 temporarily travels in parallel with another vehicle 220 and then avoids the parallel traveling with another vehicle 220.

Figure 19:
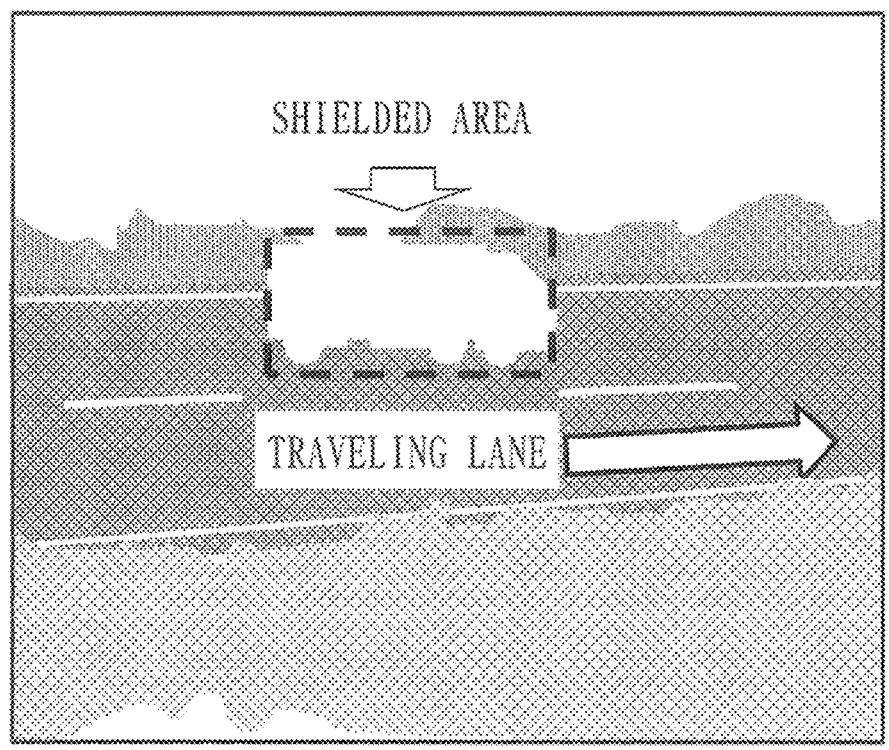
FIG. 19 is a diagram illustrating the example of the shielding relation according to the embodiments.

FIG. 19 is a picture drawing the point group image of FIG. 18.

When the measuring vehicle 201 temporarily travels in parallel with another vehicle 220 and then avoids the parallel traveling with another vehicle 220, an area in which laser light is shielded by another vehicle 220 is limited.

Warning at the time of detection of a shielded section will be described.

Figure 20:
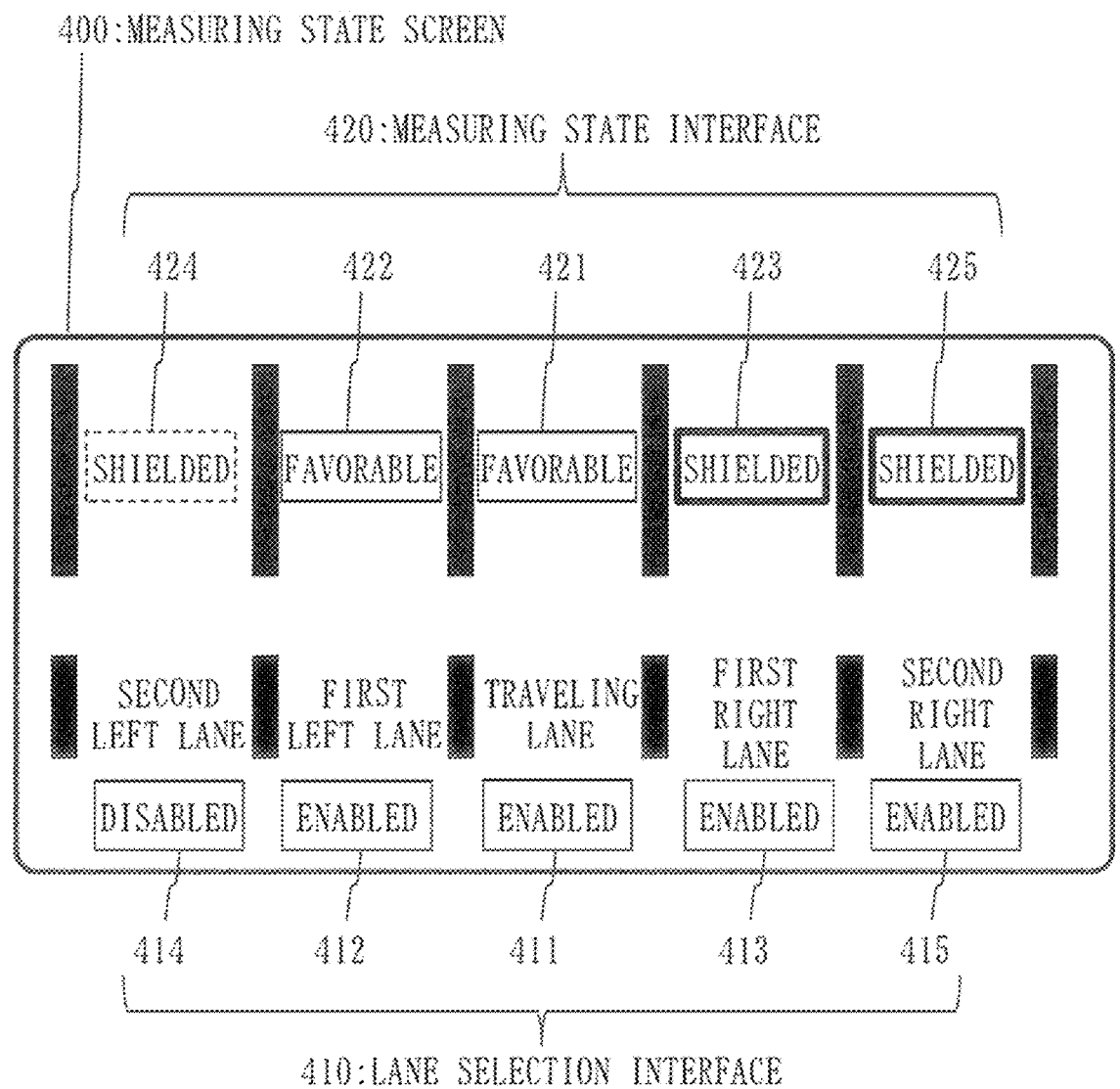
FIG. 20 is a diagram illustrating a measuring state screen 400 in the embodiments.

FIG. 20 illustrates a measuring state screen 400. The measuring state screen 400 is a screen for informing a measuring state.

The shielding detection device 100 may display a screen such as the measuring state screen 400 on its display so as to issue shielding warning.

The measuring state screen 400 represents a virtual road. The virtual road includes a plurality of lanes. In FIG. 20, the virtual road includes five lanes which are a traveling lane, a first left lane, a first right lane, a second left lane, and a second right lane. A second left lane is a lane on the immediate left of the first left lane.

The measuring state screen 400 includes graphical user interfaces such as a lane selection interface 410 and a measuring state interface 420.

The lane selection interface 410 is an interface for selecting an enabled lane from a plurality of lanes.

The measuring state interface 420 is an interface for indicating a measuring state of each lane.

The lane selection interface 410 includes a plurality of switching buttons (411 to 415) corresponding to the plurality of lanes respectively. Each of the switching buttons indicates a state (enabled or disabled) of a corresponding lane.

The switching button 411 is a button for switching a state of the traveling lane into enabled or disabled.

The switching button 412 is a button for switching a state of the first left lane into enabled or disabled.

The switching button 413 is a button for switching a state of the first right lane into enabled or disabled.

The switching button 414 is a button for switching a state of the second left lane into enabled or disabled.

The switching button 415 is a button for switching a state of the second right lane into enabled or disabled.

The measuring state interface 420 includes a plurality of state marks (421 to 425) corresponding to the plurality of lanes respectively.

The state mark 421 is arranged on the traveling lane and indicates the measuring state of the traveling lane.

The state mark 422 is arranged on the first left lane and indicates the measuring state of the first left lane.

The state mark 423 is arranged on the first right lane and indicates the measuring state of the first right lane.

The state mark 424 is arranged on the second left lane and indicates the measuring state of the second left lane.

The state mark 425 is arranged on the second right lane and indicates the measuring state of the second right lane.

A user categorizes each lane in the measuring state screen 400 into an enabled lane or a disabled lane. An enabled lane is a lane that exists on a measurement road. A disabled lane is a lane that does not exist on the measurement road.

A user operates the lane selection interface 410 with an input device. Specifically, the user presses each switching button (411, 412, 413, 414, or 415) by operating a mouse so as to switch the state of each lane.

The shielding detection device 100 receives a categorization result of each lane via the lane selection interface 410. Thus, a lane existing on the measurement road is specified.

In FIG. 20, four switching buttons (411 to 413 and 415) indicate enabled. That is, there are four lanes which are a traveling lane, a first left lane, a first right lane, and a second right lane on the measurement road. Further, the switching button 414 indicates disabled. That is, the second left lane does not exist on the measurement road. When the second left lane is disabled with the switching button 414, the shielding detection device 100 changes the state mark 424 into a disabled state.

When the shielding detection device 100 detects a shielded section, the shielding detection device 100 changes the state mark for a lane corresponding to the shielded section in the measuring state interface 420 into a shielded state.

In FIG. 20, the state mark 423 and the state mark 425 indicate the shielded state. That is, the measuring state screen 400 represents that the first right lane and the second right lane have been shielded.

The shielding detection device 100 has features as the following, for example.

First, the shielding detection unit 111 calculates at least one of the length of a point group missing area, the size of the point group missing area, the change degree of point group density, and the change degree of the number of point groups per predetermined length in the three-dimensional point group data 193.

Then, the shielding detection unit 111 compares the length of the point group missing area, the size of the point group missing area, the change degree of the point group density, and the change degree of the number of point groups with respective threshold values.

When the length of the point group missing area, the size of the point group missing area, the change degree of the point group density, or the change degree of the number of point groups is equal to or greater than the corresponding threshold value, the shielding detection unit 111 detects an occurrence of shielding.

The missing area is an area in which point groups of a road surface are missing. The missing area corresponds to a candidate section.

The length of a missing area, the size of the missing area, the change degree of point group density, and the change degree of the number of point groups correspond to the shielded amount of a candidate section.

The detection of an occurrence of shielding corresponds to detection of a shielded section.

First, the shielding detection unit 111 calculates at least either one of the length of a point group missing area in a white line which is automatically formed based on the three-dimensional point group data 193 and the size of the point group missing area in the white line.

Then, the shielding detection unit 111 compares the length of the point group missing area in the white line and the size of the point group missing area in the white line with respective threshold values.

When the length of the point group missing area in the white line or the size of the point group missing area in the white line is equal to or greater than the corresponding threshold value, the shielding detection unit 111 detects an occurrence of shielding.

Features related to FIGS. 14 and 15 will be described.

The shielding detection unit 111 performs processing as the one described below based on information indicating a relative distance and a relative angle (an elevation angle and an azimuth angle, for example) (at the time calculating a three-dimensional point group), with respect to the measuring vehicle 201, to each measurement spot which corresponds to a corresponding three-dimensional point in the three-dimensional point group data 193. This information corresponds to laser point group data.

First, the shielding detection unit 111 calculates a distance to an area corresponding to a road surface within an angle range on a position on which the measuring vehicle 201 is to be present or on a traveling locus, by using a condition in which a distance to each measurement point rarely changes when an angle corresponding to each lane is fixed and each measurement point is a spot on the road surface.

Then, the shielding detection unit 111 compares the distance to the area corresponding to the road surface within the angle range on the position on which the measuring vehicle 201 is to be present or on the traveling locus with a threshold value.

When the distance to the area corresponding to the road surface within the angle range on the position on which the measuring vehicle 201 is to be present or on the traveling locus is shortened by the threshold value or greater (when the distance is extremely shortened), the shielding detection unit 111 determines that each corresponding three-dimensional point corresponds to a shielded state. This determination corresponds to detection of each three-dimensional point of a candidate section.

The description will be provided with reference to FIG. 14.

The three-dimensional point group data 193 is obtained by radiating laser light from the laser scanner 213 of the measuring vehicle 201. For each of the angle ranges (221 to 224) in which laser light is radiated, information about a measurement distance (Li) of a laser light radiation point, corresponding to a scanning angle (Oi) in the depression angle direction of the laser light, is preliminarily recorded as reference data. Specifically, a reference distance (Lia) of a laser light radiation point on a road of a case where there is no shielding object on the road on a position on which the measuring vehicle 201 is to be present or on the traveling locus is preliminarily recorded as reference data.

When there is a shielding object on a road, a part in which the measurement distance (Li) is significantly shorter (for example, 50 to 80 percent or smaller) than the reference distance (Lia) is generated.

The shielding detection unit 111 determines presence/absence of shielding based on comparison between the reference distance (Lia) and the measurement distance (Li) as follows.

When the measurement distance (Li) from the measuring vehicle 201 in the three-dimensional point group data 193 is shorter than a predetermined threshold value (Lia0) on each measurement position on the traveling locus of the measuring vehicle 201, the shielding detection unit 111 determines that shielding has occurred. The threshold value (Lia0) is a value within a range from 50 percent to 80 percent inclusive of the reference distance (Lia), for example.

In the example of FIG. 14, the measurement distance (Li) is shorter than the threshold value (Lia0) in each of the angle ranges (223 and 224), and the shielding detection unit 111 determines that there is a shielding object (corresponding to another vehicle 220) on the road.

The description will be provided with reference to FIG. 15.

The three-dimensional point group data 193 is obtained by radiating laser light from the laser scanner 213 of the measuring vehicle 201. For each of the angle ranges (225 to 228) in which laser light is radiated, information about a measurement distance (Li) of a laser light radiation point, corresponding to a scanning angle ((pi) in the azimuth angle direction of the laser light, is preliminarily recorded as reference data. Specifically, a reference distance (Lib) of a laser light radiation point on a road of a case where there is no shielding object on the road on a position on which the measuring vehicle 201 is to be present or on the traveling locus is preliminarily recorded as reference data.

When there is a shielding object on a road, a part in which the measurement distance (Li) is significantly shorter (for example, 50 to 80 percent or smaller) than the reference distance (Lib) is generated.

The shielding detection unit 111 determines presence/absence of shielding based on comparison between the reference distance (Lib) and the measurement distance (Li) as follows.

When the measurement distance (Li) from the measuring vehicle 201 in the three-dimensional point group data 193 is shorter than a predetermined threshold value (Lib0) on each measurement position on the traveling locus of the measuring vehicle 201, the shielding detection unit 111 determines that shielding has occurred. The threshold value (Lib0) is a value within a range from 50 percent to 80 percent inclusive of the reference distance (Lib), for example.

In the example of FIG. 15, the measurement distance (Li) is shorter than a predetermined threshold value Lib0 in each of the angle ranges (227 and 228), and the shielding detection unit 111 determines that there is a shielding object (corresponding to another vehicle 220) on the road.

Features related to FIG. 20 will be described.

The result display unit 112 displays another lane in a manner to indicate whether the other lane (the first left lane, the first right lane, or the second right lane) is in a shielded state or the other lane is in a favorable state, in a state in which the own lane (traveling lane) of the measuring vehicle 201 is arranged on the center.

The result display unit 112 displays a non-existing lane (the second left lane) as a disabled lane or does not display the non-existing lane.

Each embodiment is an example of a preferred embodiment and is not intended to limit the technical scope of the present invention. Each embodiment may be partially implemented or may be implemented in combination with other embodiments. The procedure described by using the flowchart or the like may be changed as appropriate.

The shielding detection device 100 may be a system composed of a plurality of devices.

"Unit" which is an element of the shielding detection device 100 may be read as "process" or "step".

REFERENCE SIGNS LIST

100: shielding detection device; 101: processor; 102: memory; 103: auxiliary storage device; 104: communication device; 105: input output interface; 109: processing circuitry; 111: shielding detection unit; 112: result display unit; 121: point group coupling unit; 190: storage unit; 191: measurement data; 192: vehicle position data; 193: three-dimensional point group data; 200: mobile mapping system; 201: measuring vehicle; 210: measurement system; 211: antenna; 212: camera; 213: laser scanner; 214: IMU; 220: another vehicle; 221: angle range; 222: angle range; 223: angle range; 224: angle range; 225: angle range; 226: angle range; 227: angle range; 228: angle range; 300: target road map; 310: target road; 400: measuring state screen; 410: lane selection interface; 411: switching button; 412: switching button; 413: switching button; 414: switching button; 415: switching button; 420: measuring state interface; 421: state mark; 422: state mark; 423: state mark; 424: state mark; 425: state mark

The invention claimed is:

1. A measuring vehicle, comprising:
a shielding detection device including processing circuitry configured to, while the measuring vehicle travels on and measures a road surface of a target road,
detect one or more shielded sections in which the road surface of the target road is not measured, based on three-dimensional point group data indicating a three-dimensional coordinate value of each measurement spot measured by a laser scanner mounted on the measuring vehicle;
generate a target road map and display the target road map, the target road map indicating the target road and indicating the one or more shielded sections in a manner to visually distinguish the one or more shielded sections from each unshielded section in which the road surface of the target road is not measured; and
generate and display a warning indicating presence of the one or more shielded sections,
wherein, in response to the warning, the measuring vehicle remeasures the one or more shielded sections prior to leaving the target road.

2. The measuring vehicle according to claim 1, wherein the processing circuitry detects one or more candidate sections in which the road surface of the target road is not measured, based on the three-dimensional point group data, calculates a shielded amount of each of the candidate sections, and determines each candidate section corresponding to a shielded amount exceeding a threshold value, as a shielded section.

3. The measuring vehicle according to claim 2, wherein the shielded amount of each of the candidate sections is any one of a distance of each of the candidate sections, a time length taken for measuring each of the candidate sections, and a size of each of the candidate sections based on the distance of each of the candidate sections and the time length of each of the candidate sections.

4. The measuring vehicle according to claim 2, wherein the processing circuitry determines each candidate section corresponding to the shielded amount exceeding the threshold value as a shielded section, among remaining candidate sections excluding a candidate section, in which the road surface of the target road is not measured on a right side of a traveling lane on which the measuring vehicle travels because a right lane does not exist with respect to the traveling lane, and a candidate section, in which the road surface of the target road is not measured on a left side of the traveling lane because a left lane does not exist with respect to the traveling lane.

5. The measuring vehicle according to claim 1, wherein the processing circuitry categorizes each of the one or more shielded sections into any one of a right-side shielded section in which the road surface of the target road is not measured on the right side of the traveling lane on which the measuring vehicle travels, a left-side shielded section in which the road surface of the target road is not measured on the left side of the traveling lane, and a both-side shielded section in which the road surface of the target road is not measured on both of a lane on the right side of the traveling lane and a lane on the left side of the traveling lane, and distinguishes the right-side shielded section, the left-side shielded section, and the both-side shielded section from each other on the target road map.

6. The measuring vehicle according to claim 1, wherein the processing circuitry distinguishes each shielded section from each unshielded section for every lane on the target road map.

7. The measuring vehicle according to claim 1, wherein the processing circuitry detects one or more shielded sections with respect to each of a plurality of pieces of three-dimensional point group data that are obtained through a plurality of times of traveling on the target road by the measuring vehicle, and generates coupled point group data by combining pieces of three-dimensional point group data corresponding to sections that are not shielded sections among the plurality of pieces of three-dimensional point group data.

8. The measuring vehicle according to claim 1, wherein the processing circuitry detects an occurrence of shielding when any one of a length of a point group missing area, a size of the point group missing area, a change degree of point group density, and a change degree of the number of point groups per predetermined length in the three-dimensional point group data is equal to or greater than a corresponding threshold value.

9. The measuring vehicle according to claim 1, wherein the processing circuitry detects an occurrence of shielding when either one of a length of a point group missing area in a white line that is automatically formed based on the three-dimensional point group data and a size of the point group missing area in the white line is equal to or greater than a corresponding threshold value.

10. The measuring vehicle according to claim 1, wherein the processing circuitry determines that each corresponding three-dimensional point corresponds to a shielded state when a distance to an area corresponding to a road surface within an angle range on a position on which the measuring vehicle is to be present or on a traveling locus is shortened by a threshold value or greater, based on information indicating a relative distance and a relative angle, with respect to the measuring vehicle, to each measurement spot which corresponds to a corresponding three-dimensional point in the three-dimensional point group data.

11. The measuring vehicle according to claim 1, wherein the processing circuitry displays another lane in a manner to indicate whether the other lane is in a shielded state or the other lane is in a favorable state, in a state in which an own lane of the measuring vehicle is arranged on a center.

12. The measuring vehicle according to claim 1, wherein the processing circuitry displays another lane in a manner to indicate whether the other lane is in a shielded state or the other lane is in a favorable state, in a state in which an own lane of the measuring vehicle is arranged on a center, and displays a non-existing lane as a disabled lane or does not display the non-existing lane.

13. The measuring vehicle according to claim 1, wherein the processing circuitry displays the warning on the target road map.

14. A non-transitory computer readable medium storing a shielding detection program that causes a measuring vehicle that includes a computer to perform a method comprising:

while the measuring vehicle travels on and measures a road surface of a target road:

detecting one or more shielded sections in which the road surface of the target road is not measured, based on three-dimensional point group data indicating a three-dimensional coordinate value of each measurement spot that is measured by a laser scanner mounted on the measuring vehicle;

generating a target road map and displaying the target road map, the target road map indicating the target road and indicating the one or more shielded sections in a manner to distinguish the one or more shielded sections from each unshielded section in which the road surface of the target road measured; and generating and displaying a warning indicating presence of the one or more shielded sections, wherein, in response to the warning, the measuring vehicle remeasures the one or more shielded sections prior to leaving the target road.

* * * * *